United States Patent Office 3,269,976
Patented August 30, 1966

3,269,976
BRAKE LINING FROM GRAPHITE AND METAL PARTICLES IN A THERMOSETTING BINDER
Yoshitaka Ueda, 956 Takakura-cho-2-chome, Miyakojima-ku, Osaka, Japan
No Drawing. Filed Oct. 11, 1965, Ser. No. 494,962
Claims priority, application Japan, Oct. 31, 1960, 35/44,040
3 Claims. (Cl. 260—38)

This application is a continuation-in-part of copending application Serial No. 109,525, filed May 12, 1961, now abandoned.

The present invention relates to a brake lining composition and to the manufacture of brake shoe linings therefrom.

More specifically, the invention is concerned with the production of composition brake shoe linings which are especially adapted for use on railway vehicles under the same conditions as are currently employed with presently conventional cast-iron brake shoes and without the necessity of making any changes in the braking mechanism, and which possess such advantages as high resistance to wear (i.e. low rate of wear), adequate braking effect, and light weight whereby the possibility of damaging the wheels to which they are applied is excluded.

Composition brake shoes currently in use in practice on some railway vehicles frequently have a higher coefficient of friction ($\mu$=0.30—0.45) than that of cast-iron brake shoes so that, in order to achieve a low braking rate, it becomes necessary to change their braking mechanism fundamentally. Moreover, in respect to the ingredients of such composition brake shoes, there remain the unsolved problems that the granules and chips of very hard metal usually admixed therewith for the purpose of improving their wear-resisting efficiency and preventing the occurrence of so-called hair-cracks on the wheel tread result in the formation of groovings on the wheel tread, and that the large quantity of synthetic rubber or other non-heat-conducting material generally used therein reduces or lessens the heat-resisting and heat-conducting efficiencies of the product and thereby renders the wear-resisting efficiency quite inferior.

In sharp contrast, the composition brake shoe linings of the present invention are free of all these prior art defects and deficiencies and have an excellent efficiency in every respect; in particular, they excel in that—as indicated—their use on high-speed railway vehicles under the same conditions as existing case-iron brake shoes entails no changes whatever in the braking mechanism of such vehicles.

To make this point clearer, the composition brake shoe linings of the present invention—produced by first intimately admixing (a) graphite granules with (b) an appropriate synthetic thermosetting resin as hereinafter more fully defined, then intimately admixing the resultant mixture of graphite with suitable hereinafter-defined soft metal granules, and finally subjecting the so-obtained mixture to heat and pressure consolidation in a suitably configured mold—have the special features (i) that their coefficient of friction is 0.10 to 0.25 which is lower than that of currently employed composition brake shoes, (ii) that the change in their frictional efficiency due to change in speed or temperature or humidity is no more than at most 5 to 15%, and that (iii) due to the absence of hard materials as ingredients thereof, the wheel treads to which they are applied undergo very little wear and are essentially free from groovings or the like.

More specifically stated, the composition brake linings of this invention, characterized by the afore-enumerated favorable characteristics, are preferably produced by first intimately admixing graphite in the form of granules of 60 to 500 mesh in an amount of from 50 to 70 parts by weight with the synthetic resin (heat hardenable melamine-formaldehyde resin, heat hardenable melamine-nylon copolymer, heat hardenable phenol-formaldehyde resin, etc.) in an amount of from 10 to 30 parts by weight, admixing the resultant mixture of graphite granules and thermosetting resin with up to 40 parts by weight (e.g. from 5–30 parts) of soft metal granules (such as granules of copper or aluminum or lead) of 10 to 100 mesh, and then subjecting the so-obtained intimate admixture to heat and pressure consolidation in a suitably configured mold.

As a result of their high content of graphite and of the desirable properties of such ingredient, the new composition brake shoe linings are further characterized by such special features as a considerably enhanced heat-resisting efficiency, an increase in contacting area between granules, an improvement in capacities of wear-resistance, heat-conduction and toughness, a decrease in weight, and—due to the use of the soft metal granules—a free friction coefficient of $\mu$=0.02—0.35. As to binding agent, the total replacement of conventionally used synthetic rubber material by thermosetting resin of the previously mentioned types, brings about remarkable improvement in the capacities of wear-resistance, heat-resistance and toughness.

A presently-preferred illustrative embodiment according to the invention is as follows:

EXAMPLE 1

| | Percentages by weight |
|---|---|
| Graphite granules (60–500 mesh) | 50 |
| Copper granules (10–100 mesh) | 10 |
| Aluminum granules (10–100 mesh) | 15 |
| Thermosettable phenol-formaldehyde resin (60–200 mesh) | 15 |

A homogeneous mixture prepared by physically agitating and mixing these ingredients is filled into a metallic (e.g. cast-iron) mold, the mixture then heated to 170° C. while being subjected to a pressure of 150 kg./cm.$^2$, and then baked in a furnace for four hours at 80° C.

The advantages of the composition brake shoes produced according to the present invention can be seen from the following test data based upon work done by the Technical Research Institute of the Japanese National Railway Corporation.

As regards wear resistance, the conventional composition brake shoes with best quality have a wearing rate of $15 \times 10^{-7}$ mm./kg.-m. at the speed of 120 km./h. (the temperature of the wheel being 150° C.). In sharp contrast, a brake shoe composed according to Example 1 of the present application has a wearing rate of 2 to $3 \times 10^{-7}$ mm./kg.-m.; in other words, the latter has a 5 to 7 times greater wear-resisting capacity than the former. Moreover, when the speed exceeds 120 km./h. and the temperature of the wheel rises above 250° C., the rate of wear of the conventional product increases destructively, while that of the present product increases no more than 1.5 to 2 times. In the heat-resistance test, the present product is able to withstand a wheel temperature as high as 450° C. (At 450° C. and 120 km./h, the wear-resisting efficiency of the present product becomes $15 \times 10^{-7}$ mm./kg.m., which is almost the same as that of the conventional product at 150° C. at the said speed, the latter product being quickly destroyed at the 450° temperature, however.) This comparative data demonstrates the especial usefulness of the composition brake shoes of the present invention for super-high-speed railway vehicles.

In addition, there is the aforementioned advantage inherent in the instant invention that no alteration or remodelling of wheels is required, as is generally the case with conventional composition brake shoes. The new brake shoes do not damage the wheels associated therewith. They have a durability which is 6 to 8 times as long as that of cast iron shoes. Vehicles fitted therewith are assured of sufficient braking effect and comfortable drive.

A further particular advantage of the present invention is that brake linings according thereto not only have a good coefficient of friction but that such coefficient is maintained at increased speeds and at increased temperatures. Thus the average coefficient of friction of 0.18 up to 120 km./h. remains substantially unchanged at speeds up to 260 km./h. and at temperature increases up to 380° C. and even up to 450° C.

The presently preferred embodiment hereinbefore set forth is not intended to be limitative but solely illustrative. Thus certain modifications are possible without departing from the scope and spirit of the invention. For instance the heat-and-pressure molding may take place within the temperature range from 130 to 180° C. and under a pressure within the range from 50 to 250 kg./cm.$^2$. The copper and aluminum granules mixture may be replaced by corresponding amounts of copper granules, aluminum granules, mixtures of these granules with lead granules, or mixtures of all three types of soft metal granules. The phenol-formaldehyde resin may be replaced by melamine-formaldehyde resin, etc., or by a mixture of these resins in any desired proportions. The resins are preferably employed in comminuted thermosettable solid form and of a particle size commensurate with that of the other ingredients of the new compositions, e.g. 60 to 200 mesh.

The expression "$15 \times 10^{-7}$ mm./kg.-m.," hereinbefore employed, signifies the extent of wear undergone by a test piece having a contact surface of 1 inch square in the absorption of energy corresponding to that required to lift a substance weighing 1 kg. by 1 m.

The expression "km./h." signifies kilometers per hour, and the abbreviations "mm.," "cm." and "m." refer respectively to "millimeters, centimeters and meters."

Having thus disclosed the invention, what is claimed is:

1. A vehicle wheel brake shoe lining, the coefficient of friction of which remains practically unchanged at wheel speeds between 120 kilometers per hour and 260 kilometers per hour and remains essentially unimpaired with increase in temperatures up to 450° C., which consists essentially of a heat-and-pressure molded substantially uniform admixture of graphite granules with metal granules selected from the group consisting of copper, aluminum and lead and with, as binding agent, a thermoset synthetic resin selected from the group consisting of phenol-formaldehyde and melamine-formaldehyde resins, the said graphite granules being of a size within the range of 60 to 500 mesh and constituting 50 to 70% by weight of the mixture, the said metal granules being of a size within the range of 10 to 100 mesh and constituting 5 to 30% by weight of the mixture, and the resinous binding agent constituting 20 to 50% by weight of the mixture.

2. The brake shoe lining of claim 1 wherein said graphite constitutes about 50% by weight of the mixture, said metal granules constitute about 25% by weight of the mixture and said thermosettable synthetic resin constitutes about 25% by weight of the mixture.

3. A brake shoe lining composition consisting essentially of an admixture of about 50% by weight of graphite granules being of a size within the range of 60 to 500 mesh, about 10% by weight granules of copper being of a size within the range of 10 to 100 mesh, about 15% by weight granules of aluminum being of a size within the range of 10 to 100 mesh, and about 25% by weight of phenol-formaldehyde resin.

References Cited by the Examiner

UNITED STATES PATENTS

| | | | |
|---|---|---|---|
| 2,110,571 | 3/1938 | Elerath | 106—7.5 |
| 2,369,502 | 2/1945 | Walker | 106—36 |
| 2,587,945 | 3/1952 | Wirth | 154—81 |
| 2,901,456 | 8/1959 | Spokes et al. | 260—41.5 |
| 3,210,303 | 10/1965 | Biggs | 260—19 |

MORRIS LIEBMAN, *Primary Examiner.*

A. H. KOECKERT, *Assistant Examiner.*